No. 724,710. PATENTED APR. 7, 1903.
S. H. JONES.
SEEDING MACHINE.
APPLICATION FILED OCT. 30, 1902.
NO MODEL. 2 SHEETS—SHEET 1.

Witnesses
Inventor
Sylvester H. Jones
By Wood & Wood
Attorneys

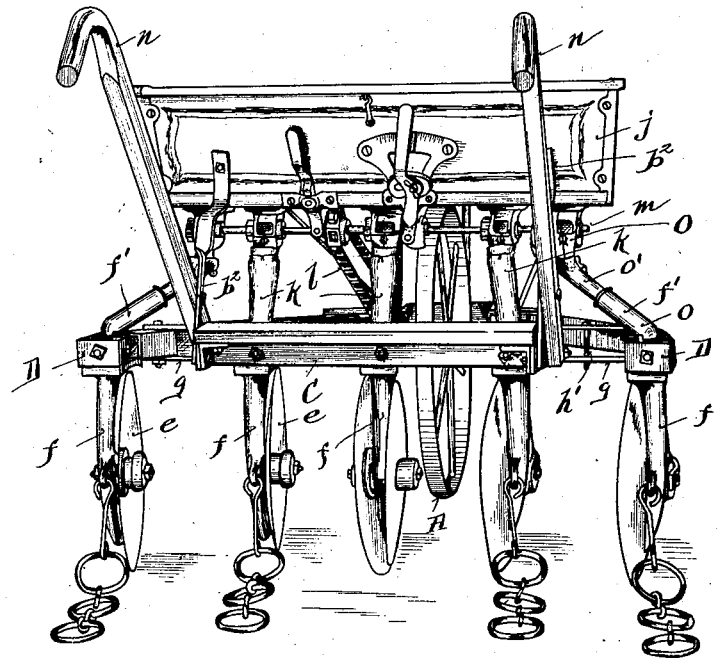

UNITED STATES PATENT OFFICE.

SYLVESTER H. JONES, OF RICHMOND, INDIANA, ASSIGNOR TO HOOSIER DRILL COMPANY, OF RICHMOND, INDIANA, A CORPORATION.

SEEDING-MACHINE.

SPECIFICATION forming part of Letters Patent No. 724,710, dated April 7, 1903.

Application filed October 30, 1902. Serial No. 129,354. (No model.)

*To all whom it may concern:*

Be it known that I, SYLVESTER H. JONES, a citizen of the United States, residing at Richmond, in the county of Wayne and State of Indiana, have invented certain new and useful Improvements in Seeding-Machines, of which the following is a specification.

My invention relates to an improvement in walking-drills of that class which are adapted to plant seed between corn-rows.

In drilling winter-wheat planted between corn-rows it is desirable to have the two outside drill-rows as near the corn as possible, so as to leave as little space as possible between the wheat-rows on each side of the corn-row and also to cultivate and cut out the weeds over as much ground as possible. Practically corn-rows are not straight, the hills being more or less zigzag. In seeders of this description it is customary to have the drag-bars rigid or in a fixed position, and if they are set only so wide as to go between or miss all of the corn hills or stalks a wide space is left between the drills on each side of a given row. If set too wide, more or less of the cornstalks are torn out, which injures or destroys the ripening corn on said stalks. So, too, when the drills are used to seed between the rows after the corn is cut if the drag-bars and furrow-openers are set too wide, the stubble of the inner hills being torn and the earth firm, are apt to lift the furrow-openers out of the ground.

The object of my invention is primarily to overcome these objections and to provide a drill with two outside drag-bars having a limited lateral movement to accommodate itself to the zigzag condition of the corn-rows and to automatically adjust itself wider or narrower to the condition of the rows by the strains imparted to the furrow-disks.

The features of my invention are more fully set forth in the description of the accompanying drawings, forming a part of this specification, in which—

Figure 1:
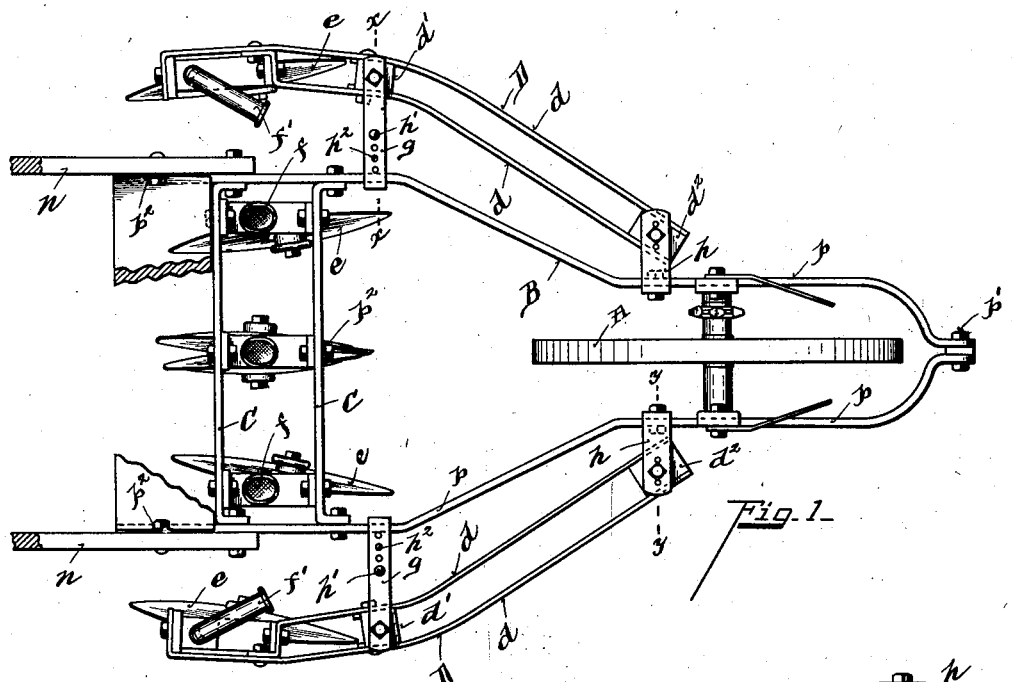
Figure 2:
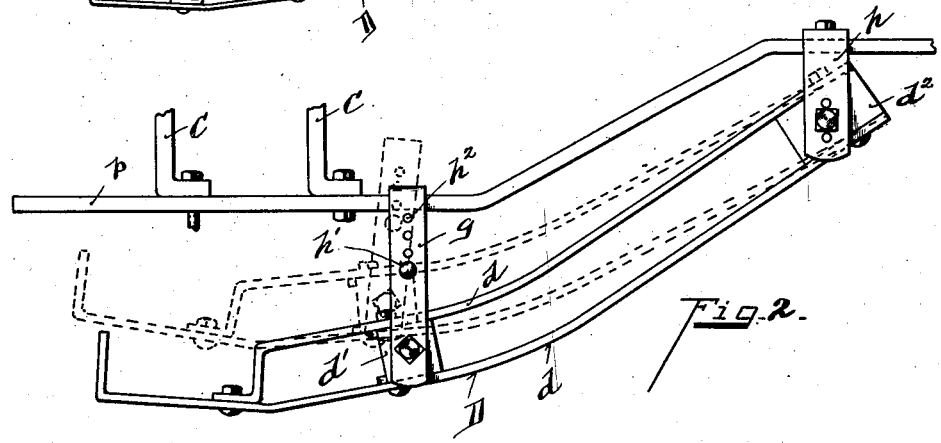
Figure 3:

Figure 1 is a plan view of the drill with the seedbox removed. Fig. 2 is an enlarged plan view of the two outside drag-bars. Fig. 3 is a perspective view of the cross frame-pieces. Fig. 4 is a rear perspective view of the drill. Fig. 5 is a section on line $x x$, Fig. 1. Fig. 6 is a section on line $y y$, Fig. 1; and Fig. 7 is a perspective view of a spacing-box between the two arms of the outside drag-bars.

Drills for seeding between corn are made usually for five seed-rows, but sometimes have three. I have shown the furrow-makers formed of disks, which are the best adapted to the features of invention herein.

A represents the pilot driving-wheel.

B represents the V-shaped frame, which supports the working parts of the drill and to which the pilot-wheel is journaled at the forward end. This frame is formed of two bars $b$, bent to the proper form. They are connected together by screw-bolts $b'$ at their front end.

C C represent the cross-rails, formed of metallic plates of the form shown in Fig. 3. They are rigidly bolted at their ends to the inside of the V-shaped frame and form the support for the inside disk and rear braces of the V-shaped frame which forms a firm support for the seed-hopper, which is anchored to and supported thereon by means of brackets $b^2$.

D D represent the two outside drag-bars, each of which is shown formed of two parallel bars $d$. They are rigidly bolted together and kept in parallel position by means of spacing-boxes $d'$ $d^2$ and form a firm support for the seed-boot $f$, seed-tubes $f'$, and the furrow-disks $e$, journaled thereto, as shown in Fig. 4. The seed-tube is secured to the rear end of the drag-bars, as shown in Fig. 1. It will be observed that the disks $e$ are inclined at an angle to the line of travel of the pilot-wheel. This is done primarily to make a furrow into which the seed is dropped. In the construction herein shown this angle and the concave form of the disk serve another important function. The outer drag-bars are each supported toward their rear end in a yoke $g$, on which it slides. The forward end of the drag-bar is pivoted to the yoke $h$, so as to afford the lateral movement of the drag-bar and attached disk. In order to allow a greater or less lateral movement of the outside drag-bars, stop-pins $h'$ are employed, and they are adjustable to any one of the series of holes $h^2$, pierced through the yoke $g$, thereby obtaining any desired amount of lateral movement. In practice the shape and position of the disks are such that the strain forces the drag-bars to their outermost positions; but when either of the disks e approaches a corn-hill or stubble which projects inwardly in the path of the disk the concave angular disk on account of the unyielding character of the corn-roots will be subjected to a greater strain upon its outer face and will be crowded inwardly, the drag-bar and yoke sliding laterally on the frame B. As soon the disk has passed the point of resistance on its outer face the strain of the earth on the inner face moves or presses the disk outwardly, and the drag-bars being free to move will yield laterally and come into normal position and bear against the stop-pin h'. The parallel form of the outer drag-bars herein shown is deemed the best form in which to employ the invention for a floating drag-bar.

It is desirable that the central grain-drill furrow be formed by throwing the dirt each way instead of all upon one side, as it would occasion side draft if three disks of the drill turn the furrow in one direction and only two in the other direction. To overcome this side draft, the central furrow-opener is formed of a pair of disks set in V shape employed with the grain spout or boot depending between them, as shown in Fig. 4. A chain or covering device such as shown in Fig. 4 may be employed, if necessary, to cover the seed and level the furrow. When the furrow is formed by throwing the dirt all to one side, a covering device such as shown in Fig. 4 is desirable in order to level down the furrows and leave the soil in good condition.

The seed-hopper j, the hose k, reaching from the seed-cups to the seed-tubes, the driving-chain l, the seed-shaft m, the handles n, and other parts of the drill not herein mentioned may be of any well-known construction.

In order that the connection of the seed-spout from the seed-cup to the seed-boot f for the outer disks may accommodate itself to the floating movement of the drag-bars without interfering with the passage of the grain, there is provided a telescopic tube. As shown in the drawings, the section o, which moves with the drag-bar, slides upon the section o' and the section o' has pivotal support upon the seed-cup O, so that the seed-spout automatically accommodates itself in length and in angle to the position of the drag-bar in any of its automatically-adjusted positions.

It will be observed that the three inside furrow-openers are journaled on pendants rigidly secured to the main frame. The central furrow-opener in the most appropriate form is two disks set in the form of a V, so as to throw the dirt each way and that the disks on the right and left hand side of the central furrow-opener are conversely disposed as to their angle of inclination with the line of travel, thereby equalizing the strains and obviating side draft. The disk form of furrow-openers is shown as the preferred form of construction; but other forms of furrow-openers might be employed and still retain the advantage due to the floating function of the two outside drag-bars; but I deem the disk form of furrow-openers as the best, not only because of the lessening of the draft of the entire machine, but because that this form of furrow-opener is more sensitive to side strains and more readily responds to varying strains, and hence more readily automatically adjust themselves to varying conditions which they encounter in ordinary practice.

Having described my invention, I claim—

1. In a seed-drill the combination of a V-shaped frame formed of two parallel bars in the side frame, two brace-bars attached to said side bars and forming the rear end of said frame, a pilot-wheel journaled to the front end of said main frame, furrow-opening supports rigidly connected to the brace-bars at the rear of said frame, floating drag-bars pivotally attached at their front end at either side of the said frame, independent supports connecting each of the said floating drag-bars to the main frame, each provided with means for allowing a limited free independent lateral movement of the respective floating bars, and disks, furrow-openers journaled to supports depending from the rear end of said drag-bars, substantially as described.

2. In a seed-drill employing a V-shaped main frame, a pilot-wheel journaled in the front end of said frame, a pair of furrow-opening disks journaled upon a support centrally depending from the rear end of said main frame, a pair of floating drag-bars pivotally attached to said main frame, conversely-disposed concave disks respectively journaled to and supported on pendants attached to the rear end of said floating drag-bars, substantially as described.

3. In a grain-drill, a frame, a pilot-wheel journaled at the front end thereof, a central, intermediate disk furrow-opener carried by the main frame, composed of two disks set at opposing angles, outside floating drag-bars pivoted to the frame at the front end, independent supports for each drag-bar connected at its rear end with the main frame, and provided with means for limiting the free lateral movement of each drag-bar independent of the other, and an adjustable seed-tube for each floating drag-bar, substantially as described.

In testimony whereof I have hereunto set my hand.

SYLVESTER H. JONES.

Witnesses:
 OLIVER B. KAISER,
 IDA J. LUCAS.